United States Patent [19]

Frodigh et al.

[11] Patent Number: 5,726,978
[45] Date of Patent: Mar. 10, 1998

[54] ADAPTIVE CHANNEL ALLOCATION IN A FREQUENCY DIVISION MULTIPLEXED SYSTEM

[75] Inventors: Carl Magnus Frodigh; Perols Leif Mikael Gudmundson, both of Kista, Sweden

[73] Assignee: Telefonaktiebolaget L M Ericsson publ., Stockholm, Sweden

[21] Appl. No.: 493,489

[22] Filed: Jun. 22, 1995

[51] Int. Cl.$^6$ ........................................ H04J 1/16
[52] U.S. Cl. ............... 370/252; 370/333; 455/63
[58] Field of Search ............... 370/17, 13, 95.1, 370/95.2, 95.3, 71, 57, 19, 18, 30, 73, 69.1, 247, 252, 251, 254, 314, 332, 333, 337, 341, 344, 345, 346, 350, 281, 320, 335, 342, 478, 479, 480, 481; 375/200–205, 227, 254, 278, 284, 285, 293; 455/33.1–33.3, 34.1, 54.1, 50.1, 51.1, 52.2, 52.3, 57.1, 63, 65, 67, 67.1, 67.3, 67.4, 101; 379/58–60

[56] References Cited

U.S. PATENT DOCUMENTS

| | | | |
|---|---|---|---|
| 3,864,521 | 2/1975 | DeLong et al. | 370/71 |
| 4,528,656 | 7/1985 | Morais | 370/30 |
| 4,736,453 | 4/1988 | Schloemer | 455/33 |
| 4,783,779 | 11/1988 | Takahata et al. | 370/69.1 |
| 4,930,120 | 5/1990 | Baxter et al. | 370/73 |
| 5,014,342 | 5/1991 | Pudsey | 455/33 |
| 5,109,529 | 4/1992 | Akaiwa | 455/34.1 |
| 5,161,154 | 11/1992 | Diaz et al. | 370/95.1 |
| 5,191,576 | 3/1993 | Pommier et al. | 370/18 |
| 5,203,012 | 4/1993 | Patsiokas et al. | 455/34.1 |
| 5,239,682 | 8/1993 | Strawcynski et al. | 455/54.1 |
| 5,249,304 | 9/1993 | Mulford | 455/34.1 |
| 5,260,968 | 11/1993 | Gardner et al. | 375/200 |
| 5,263,176 | 11/1993 | Kojima et al. | 455/34.1 |
| 5,282,222 | 1/1994 | Fattouche et al. | 375/200 |
| 5,289,464 | 2/1994 | Wang | 370/69.1 |
| 5,295,138 | 3/1994 | Greenberg et al. | 370/57 |
| 5,311,550 | 5/1994 | Fouche et al. | 375/260 |
| 5,319,795 | 6/1994 | Hamabe et al. | 455/33.2 |
| 5,345,440 | 9/1994 | Gledhill et al. | 370/19 |
| 5,502,713 | 3/1996 | Lagerqvist et al. | 370/17 |
| 5,513,174 | 4/1996 | Punj | 370/17 |

OTHER PUBLICATIONS

Leonard J. Cimini, Jr., IEEE Transactions on Communications, vol. COM-33, No. 7, Jul. 1985, "Analysis and Simulation of a Digital Mobile Channel Using Orthogonal Frequency Division Multiplexing", pp. 665–675.

M. Alard and R. Lassalle, EBU Review, technical No. 224, Aug. 1987, "Principles of Modulation and Channel Coding for Digital Broadcasting for Mobile Receivers", pp. 47–69.

D. DiZenobio, G. Santella and Fondazione Ugo Bordoni, The Fourth International Symposium on Personal, Indoor and Mobile Radio Communications, Yokahama, Japan, Sep. 8–11, 1993, "OFDM Technique for Digital Television Broadcasting to Portable Receivers", pp. 244–248.

Håkan Eriksson and Randall Bownds, IEEE 1991, "Performance of Dynamic Channel Allocation in the DECT System", pp. 693–698.

(List continued on next page.)

*Primary Examiner*—Dang Ton
*Attorney, Agent, or Firm*—Jenkens & Gilchrist, PC; Brian T. Rivers

[57] ABSTRACT

A method and system of adaptive channel allocation in a frequency division multiplexed system is provided. In the method and system a subset of M subcarriers is chosen from a larger set of N subcarriers available for communications on a link. As communications take place on the link, signal quality (C/I) measurements on the subcarriers of the subset of M subcarriers and interference (I) measurements on the subcarriers of the group of N subcarriers are periodically performed. The C/I and I measurements are then used to reconfigure the subset of M subcarriers to reduce co-channel interference on the link.

22 Claims, 8 Drawing Sheets

OTHER PUBLICATIONS

Reiner Beck and Herbert Panzer, IEEE 1989, "Strategies for Handover and Dynamic Channel Allocation in Micro-Cellular Mobile Radio Systems", pp. 178–185.

Syuji Yasuda and Seizo Onoe, IEEE 1992, "Autonomous Channel Assignment Control for Flexible Reuse in Mobile Radio Systems", pp. 798–801.

Håkan Andersson, Håkan Eriksson, Anna Fallgren and Magnus Madfors, IEEE 1992, "Adaptive Channel Allocation in a TIA IS-54 System", pp. 778–781.

Håkan Eriksson, IEEE 1988, "Capacity Improvement by Adaptive Channel Allocation", pp. 1355–1359.

Eduardo F. Casa and Cyril Leung, IEEE 1991, "OFDM for Data Communication Over Mobile Radio FM Channels—Part I: Analysis and Experimental Results", pp. 783–793.

ADAPTIVE CHANNEL ALLOCATION IN A FREQUENCY DIVISION MULTIPLEXED SYSTEM

BACKGROUND OF THE INVENTION

1. Field of the Invention

This invention relates to cellular telecommunications systems and, more particularly, to a method and system of adaptive channel allocation in a frequency division multiplexed cellular system.

2. Description of the Prior Art

In a cellular telecommunications system the user of a mobile station communicates with the system through a radio interface while moving about the geographic coverage area of the system. The radio interface between the mobile station and system is implemented by providing base stations dispersed throughout the coverage area of the system, each capable of radio communication with the mobile stations operating within the system. In a typical cellular telecommunications system each base station of the system controls communications within a certain geographic coverage area termed a cell, and a mobile station which is located within a particular cell communicates with the base station controlling that cell. As a mobile station moves throughout the system control of the communication between the system and mobile station are transferred from cell to cell according to the movement of the mobile station throughout the system.

Existing cellular telecommunications systems operate according to various air interface standards which assure the compatibility of equipment designed to operate in a particular system. Each standard provides specific details of the processes that take place between the mobile stations and base stations of the system in all modes of operation, including during idle states, during rescan of control channels, during registration, and during connection to voice or traffic channels. Advances in cellular systems technology have been rapid in recent years. These advances in technology have been driven by increases in demand for the increasingly sophisticated services offered by cellular systems. As cellular systems technology and the total number of cellular systems has increased worldwide to meet this demand, there has also been an accompanying increase in the number of system standards according to which these cellular systems operate.

In cellular telecommunications systems, as in most radio systems, the frequency bandwidth available for use is a limited resource. Because of this, emphasis is often concentrated on making the most efficient use possible of the available frequency bandwidth when developing new cellular systems. Additionally, communications within cellular systems are often subject to certain types of RF signal distortion such as multipath propagation and co-channel interference. The development of new system standards has also emphasized the need to minimize the effect of these RF signal distortions on communications within the cells of a system.

Frequency division multiplexing (FDM) is a method of transmitting data that has application to cellular systems. Orthogonal frequency division multiplexing (OFDM) is a particular method of FDM that is particularly suited for cellular systems. An OFDM signal consists of a number of subcarriers multiplexed together, each subcarrier at a different frequency and each modulated by a signal which varies discretely rather than continuously. Because the level of the modulating signal varies discretely, the power spectrum of each subcarrier follows a $(\sin x/x)^2$ distribution. The spectral shape transmitted on each subcarrier is such that the spectra of the individual sub-channels are zero at the other subcarrier frequencies and interference does not occur between subcarriers. Generally, N serial data elements modulate N subcarrier frequencies, which are then frequency division multiplexed. Each of the N serial data elements comprises a data block with a duration of T=1/fs, where fs is the bandwidth of the OFDM signal. The subcarriers of the OFDM system are separated in frequency by multiples of 1/T. Although the frequency spectrum of the subcarriers overlap, this frequency spacing makes the subcarriers orthogonal over one symbol interval so that the peak of power of each modulated carrier occurs at frequencies corresponding to nulls in the power spectrum of the other carriers. The overall spectrum of an OFDM signal is close to rectangular when a large number of OFDM carriers are contained in the OFDM signal.

During the time period, T, the OFDM signal may be represented by a block of N samples. The value of the N samples is as follows:

$$x(n) = \sum_{k=0}^{N-1} X(k) e^{2j\pi nk/N}$$

The N values X(k) represent the respective data during period T, of the discretely-varying signals modulating the OFDM carriers $e^{2j\pi K/N}$. From the above, the OFDM signal corresponds to the inverse Discrete Fourier Transform of the set of data samples X(k). To convert a data stream into an OFDM signal, the data stream is split up into blocks of N samples X(k) and an inverse Discrete Fourier Transform is performed on each block. The string of blocks that appears at a particular sample position over time constitutes a discretely-varying signal that modulates a certain subcarrier at a frequency fn.

OFDM offers several advantages that are desirable in a cellular system. In OFDM the orthogonality of the subcarriers in the frequency spectrum allows the overall spectrum of an OFDM signal to be close to rectangular. This results in efficient use of the bandwidth available to a system. OFDM also offers advantages in that interference caused by multipath propagation effects is reduced. Multipath propagation effects are caused by radio wave scattering from buildings and other structures in the path of the radio wave. Multipath propagation may result in frequency selective multipath fading. In an OFDM system the spectrum of each individual data element normally occupies only a small part of the available bandwidth. This has the effect of spreading out a multipath fade over many symbols. This effectively randomizes burst errors caused by the frequency selective multipath fading, so that instead of one or several symbols being completely destroyed, many symbols are only slightly distorted. Additionally, OFDM offers the advantage that the time period T may be chosen to be relatively large as compared with symbol delay time on the transmission channel. This has the effect of reducing intersymbol interference caused by receiving portions of different symbols at the same time.

The use of OFDM in cellular systems has been proposed by Cimini, "Analysis and Simulation of a Digital Mobile Channel Using Orthogonal Frequency Division Multiplexing", *IEEE Trans. Commun.*, Vol. 33, No. 7, pp. 665–675 (July, 1985). A similar application of OFDM in a mobile system has also been proposed by Casa, "OFDM for Data Communication Over Mobile Radio FM-Channels- Part I: Analysis and Experimental Results", *IEEE Trans. Commun.*, Vol. 39, No. 5, pp. 783–793 (May, 1991). In these OFDM cellular systems a set of subcarrier frequencies is assigned to each communications link created for transmission from a base station to a mobile station (downlink) and from a mobile station to a base station (uplink) operating within a cell. The set of subcarrier frequencies allocated to each communications link is chosen from all subcarrier frequencies available to the system. Within a cell the same subcarrier frequency cannot be assigned to more than one communications link. Thus, co-channel interference between subcarriers within the same cell does not occur. However, it is possible in such an OFDM system that a communications link in a cell of the system is assigned a set of subcarriers frequencies that includes one or more subcarriers frequencies also assigned to a communications link set up in another cell within the system. Each of these commonly assigned subcarriers frequencies may be subject to co-channel interference caused by the use of the same subcarrier frequency in the other cells. In these OFDM systems no method or system exists for coordinating the assignment of subcarrier frequencies to communications links created within different cells. In such a system the co-channel interference in a communications link caused by a subcarrier used in a neighboring cell could be very large.

Methods of allocating channel frequencies among cells in non-OFDM systems have been developed that reduce or minimize co-channel interference. Adaptive Channel Allocation (ACA) is such a method. In ACA any channel frequency allocated to a cellular system may be used to set up a link in any cell of the system regardless of whether or not the frequency is used elsewhere in the system as long as certain interference criteria are met. The channel frequencies may also be freely reused throughout the system as long as the interference criteria are met.

In Adaptive Channel Allocation various measurements of signal quality and interference levels on dynamically allocated channel frequencies are performed within the coverage area of a cell to build a list of traffic or voice channels that may be assigned to communications links to be created within the cell. The base station controlling the cell and mobile stations within the cell's coverage area perform measurements on the set of channel frequencies that the system operator has allocated to be dynamically allocated for communications within the system. Generally, both uplink and downlink measurements are performed. Based on these measurements, when a new link is to be created, a channel frequency is assigned to the link based on some rule. For example, in minimum interference ACA the system builds a table of channels from the least interfered (highest quality) to the most interfered (lowest quality) channels as measured within each cell. The system then selects a certain number of least interfered channel frequencies from that list to allocate to communication in that cell. Other criteria, such as certain required frequency separation between the channels chosen and avoiding certain combinations of channels whose frequencies create intermodulation are also considered. As an example of ACA, H. Eriksson, "Capacity improvement by Adaptive Channel Allocation", *IEEE Global Telecomm. Conf.*, pp. 1355–1359, Nov. 28–Dec. 1, 1988, illustrates the capacity gains associated with a cellular radio system where all of the channels are a common resource shared by all base stations. In the above-referenced report, the mobile measures the signal quality of the downlink, and channels are assigned on the basis of selecting the channel with the highest carrier to interference ratio (C/I level).

Existing ACA algorithms which have been created for non-OFDM cellular systems using one carrier frequency for each link cannot be effectively used in a cellular system using OFDM. One problem with the existing ACA techniques is that the number of subcarriers in an OFDM system is large compared to the number of carriers in the system that uses a single carrier for each communications link. This requires an extensive measurement effort that expends both time and system resources to obtain the uplink and downlink measurement results necessary for ACA. In addition, in order to transfer the results of the large number of downlink measurements made at a mobile station to the system for processing, use of a large amount of signaling resources is necessary.

It would provide an advantage then, to have a method and system of adaptive channel allocation for use in an OFDM system. The method and system should provide an allocation of subcarriers within an OFDM system that lessens co-channel interference between cells of the system. The method and system should also be designed to take into account the unique features of the OFDM system in order to utilize system resources effectively when allocating channels. The present invention provides such a method and system.

SUMMARY OF THE INVENTION

The present invention provides a method and system of adaptive channel allocation (ACA) in an orthogonal frequency division multiplexed (OFDM) system. The method and system provides an allocation of subcarriers to each link of the OFDM system that lessens co-channel interference between cells of the system.

The present invention also overcomes the difficulties and shortcomings presented with implementing conventional ACA methods and systems designed for use in a non-OFDM system into an OFDM system. Conventional ACA methods are designed to adaptively allocate RF channels to systems where one channel is used per link. As applied to an OFDM system, these conventional ACA methods would require that all OFDM subcarriers assigned to users to be adaptively allocated. Adaptively allocating all OFDM subcarriers in an OFDM system would require an overly large amount of measurement and signaling resources to transfer channel measurement information and the assignment information between receivers and transmitters of the system. By selectively choosing the subcarriers to be adaptively allocated, and setting criteria for allocation determination, the system and method of the present invention minimizes the use of measurement and signaling resources while still providing effective ACA.

In a first aspect of the invention, an initial subset of M subcarriers is chosen from a larger group of N subcarriers that are available for communications on each separate link of the OFDM system. The number M depends on the data rate of the particular link and may vary between the links of the system. The subset of M subcarriers is then used to carry communications on the link. As communications take place, the signal quality level (C/I) of the subcarriers within the subset of M subcarriers, and the interference level (I) of all N available subcarriers is periodically measured. These C/I and I measurement results are reported to the system. During communications on the link the system determines from the C/I and I measurements if a more preferred unused subcarrier which would give better signal reception on the link than a subcarrier of the set of M is available in the cell within which the link exists. If it is determined that a more preferred unused subcarrier exists, the system reconfigures the subset of M subcarriers to include the unused subcarrier.

In a second aspect of the invention, a mobile station as link receiver transmits only a limited set of measurement results to the system at certain select reporting intervals rather than all measurement results. The transmitted limited set of measurement results comprises a select number of the lowest C/I measurement results and a select number of the lowest I measurement results. The transmission of the limited set of results reduces the use of uplink system signaling resources.

In an alternative embodiment of the invention a mobile station as link receiver periodically measures the signal quality level (C/I) of the subcarriers within the subset of M subcarriers, and the interference level (I) of all N available subcarriers. The mobile station then determines candidate replacement subcarriers for the link based on the C/I and I measurements, and transmits a subcarrier request message to the system requesting that the candidate subcarrier be assigned to replace a subcarrier of the link. The system responds to the subcarrier request message with a subcarrier accepted or subcarrier rejected message. If a subcarrier accepted message is received, the mobile station reconfigures the subset of M subcarriers to contain the candidate replacement subcarrier. If the subcarrier is rejected, the mobile station transmits a subcarrier request message requesting a new candidate subcarrier.

DETAILED DESCRIPTION OF THE INVENTION

Figure 1:
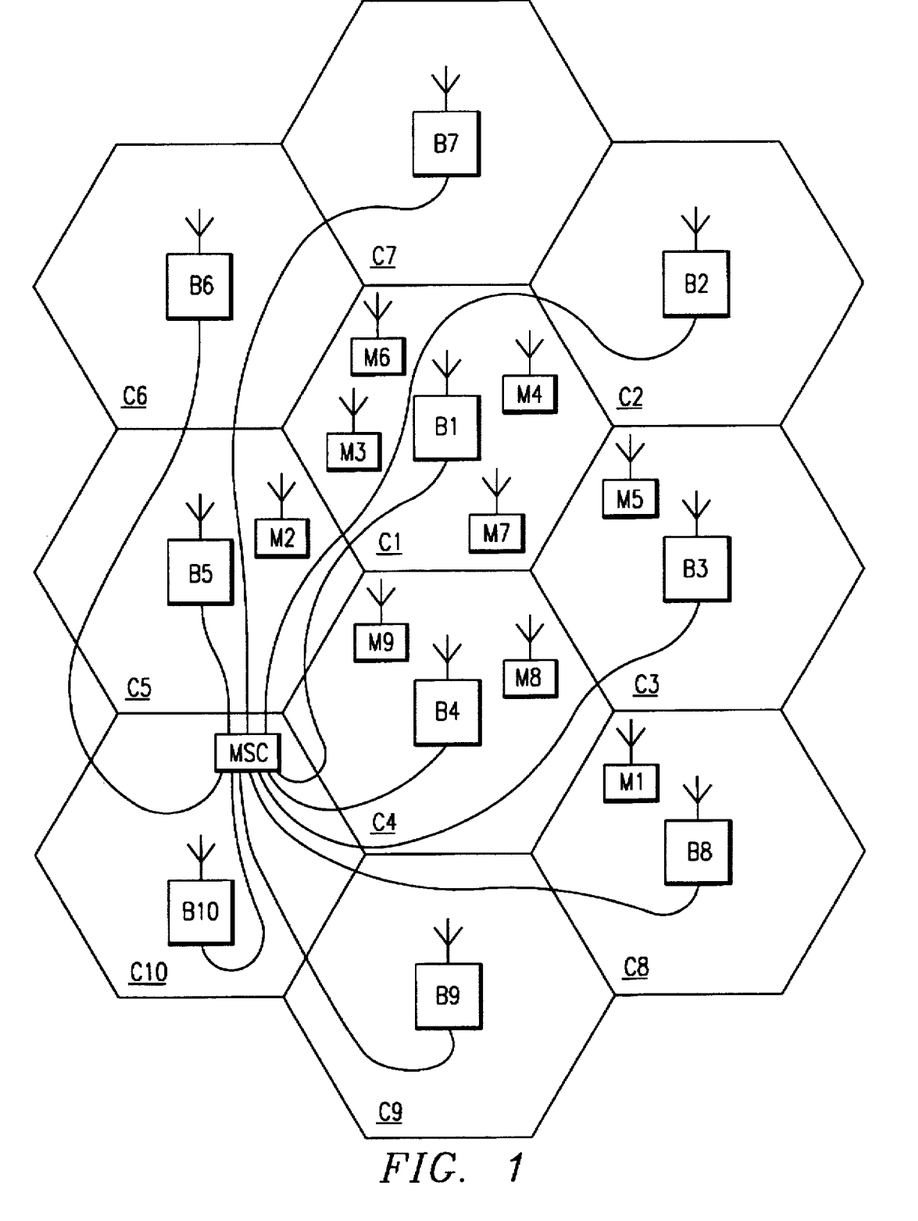
FIG. 1 illustrates a cellular telecommunications network within which the present invention may be implemented.

Referring to FIG. 1, there is illustrated a frequency division multiplexed (FDM) cellular telecommunications system of the type to which the present invention generally pertains. In FIG. 1, an arbitrary geographic area may be divided into a plurality of contiguous radio coverage areas, or cells C1–C10. While the system of FIG. 1 is illustratively shown to include only 10 cells, it should be clearly understood that in practice, the number of cells will be much larger.

Associated with and located within each of the cells C1–C10 is a base station designated as a corresponding one of a plurality of base stations B1–B10. Each of the base stations B1–B10 includes a transmitter, a receiver, and a base station controller as are well known in the art. In FIG. 1, the base stations B1–B10 are illustratively located at the center of each of the cells C1–C10, respectively, and are equipped with omni-directional antennas. However, in other configurations of the cellular radio system, the base stations B1–B10 may be located near the periphery, or otherwise away from the center of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of the cellular telecommunications system within which the present invention is implemented.

With continuing reference to FIG. 1, a plurality of mobile stations M1–M10 may be found within the cells C1–C10. Again, only 10 mobile stations are shown in FIG. 1 but it should be understood that the actual number of mobile stations will be much larger in practice and will invariably greatly exceed the number of base stations. Moreover, while none of the mobile stations M1–M10 may be found in some of the cells C1–C10, the presence or absence of the mobile stations M1–M10 in any particular one of the cells C1–C10 should be understood to depend in practice on the individual desires of the users of mobile stations M1–M10 who may roam from one location in the cell to another or from one cell to an adjacent cell or neighboring cell, and even from one cellular radio system served by a particular MSC to another such system.

Each of the mobile stations M1–M10 is capable of initiating or receiving a telephone call through one or more of the base stations B1–B10 and a mobile station switching center MSC. A mobile station switching center MSC is connected by communication links, e.g., cables, to each of the illustrative base stations B1–B10 and to the fixed public switched telephone network PSTN, not shown, or a similar fixed network which may include an integrated system digital network (ISDN) facility. The relevant connections between the mobile station switching center MSC and the base stations B1–B10, or between the mobile station switching center MSC and the PSTN or ISDN, are not completely shown in FIG. 1 but are well known to those of ordinary skill in the art. Similarly, it is also known to include more than one mobile station switching center in a cellular radio system and to connect each additional mobile station switching center to a different group of base stations and to other mobile station switching center via cable or radio links.

Each MSC may control in a system the administration of communication between each of the base stations B1–B10 and the mobile stations M1–M10 in communication with it. As a mobile station roams about the system, the mobile station registers its location with the system through the base station that controls the area in which the mobile station is located. When the mobile station telecommunications system receives a call addressed to a particular mobile station, a paging message addressed to that mobile station is broadcast on control channels of the base stations which control the area in which the mobile station is believed to be located. Upon receiving the paging message addressed to it, the mobile station scans system access channels and sends a page response to the base station from which it received the strongest access channel signal. The process is then initiated to create the call connection. The MSC controls the paging of a mobile station believed to be in the geographic area served by its base stations B1–B10 in response to the receipt of a call for that mobile station, the assignment of radio channels to a mobile station by a base station upon receipt of a page response from the mobile station, as well as the handoff communications with a mobile station from one base station to another in response to the mobile station traveling through the system, from cell to cell, while communication is in progress.

Each of the cells C1–C10 is allocated a plurality of FDM subcarrier frequencies and at least one dedicated control channel. The control channel is used to control or supervise the operation of mobile stations by means of information transmitted to and received from those units. Such information may include incoming call signals, outgoing call signals, page signals, page response signals, location registration signals and voice and traffic subcarrier assignments.

The present invention involves implementation of a method and system of adaptive channel allocation (ACA) into an FDM cellular system as shown in FIG. 1. In an exemplary embodiment of the invention, ACA is implemented into an OFDM system operating with a total system bandwidth of 5 MHz and a subcarrier spacing of 5 KHz. The total number of subcarriers available for this system is approximately 5 MHz/5 KHz=1000. The subcarriers are modulated onto a system RF carrier with a frequency of 2 GHz for transmission over the system RF channel and the frequency spectra of the transmitted signal is centered around the RF carrier. All subcarriers are available for use in each cell but a subcarrier may not be used simultaneously on more than one link in a cell. Frequency division duplex (FDD) is used for separation of the uplink and downlink subcarriers frequencies. The system includes a dedicated control channel (DCCH) that is both an uplink and downlink channel for transmitting control information for handovers, long term channel allocation information, long term power control information and measurement messages and measurement results. The system also includes a physical control channel (PCCH) that is both an uplink and downlink channel for transmitting short term channel allocation information, short term power control information, measurement messages and measurement results.

In the ACA of the invention, for each up/down link between a mobile station and base station, the system chooses a subset of a number (M) of subcarriers from a set of a number (N) of subcarriers. The set of N subcarriers is the set of subcarriers available within the system for each link, where N>M. The set of N subcarriers does not change during a communication. The set of N subcarriers may include all subcarriers of the system. Alternatively, the set of N subcarriers may be a set less in number than the total number of subcarriers available but greater in number than the number of carriers in the subset of M subcarriers.

Figure 2:
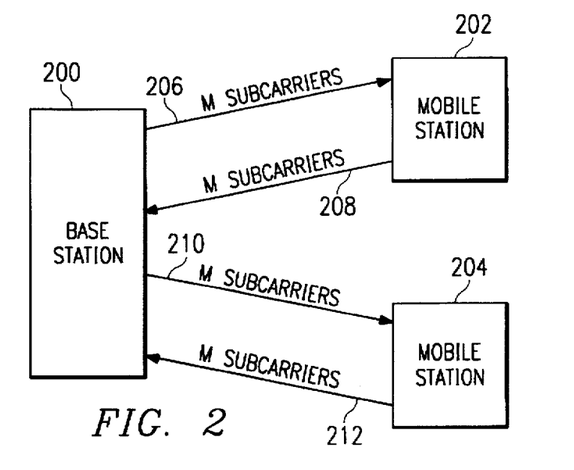
FIG. 2A illustrates the allocation of subcarriers in accordance with the present invention in an orthogonal frequency division multiplexed system.

Referring now to FIG. 2 therein is illustrated the allocation of subcarriers in accordance with the present invention in an OFDM system. Base station 200 communicates with mobile station 202 over downlink 206 and uplink 208. Base station 200 also communicates with mobile station 204 over downlink 210 and uplink 212. Transmissions on links 206, 208, 210 and 212 are made over the system RF channel. Voice and data to be transmitted on each link are modulated onto a number (M) subcarriers. The M subcarriers are then modulated onto the system RF carrier for transmission over the system RF channel. Each link 206, 208, 210 and 212, within the cell uses a separate subset of M subcarriers. The subcarriers can only be used once within a cell.

Figure 3A:
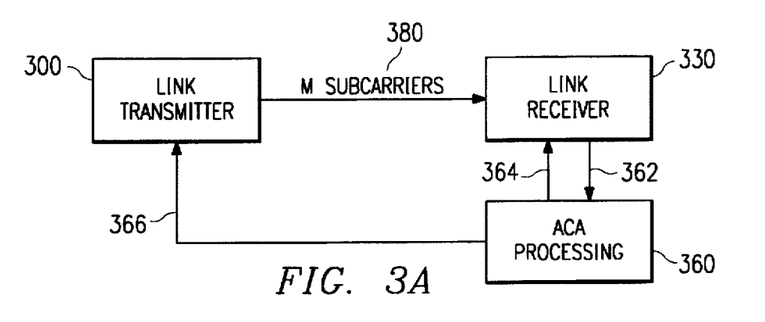
FIG. 3A is a block diagram of a system according to an embodiment of the present invention.

Referring now to FIG. 3A. therein is shown a block diagram of a system according to the present invention. The system consists of a link transmitter 300, link receiver 330, ACA processing portion 360 and RF channel 380. The receiver 330 and transmitter 300 of a particular link are located at opposite ends of the link. In the downlink the receiver 330 is located in the mobile station and the transmitter 300 is located in the base station. In the uplink the receiver 330 is located in the base station and the transmitter 300 is located in the mobile station. RF channel has a set of N available subcarriers. The link receiver 330 and link transmitter communicate over RF channel 380 using a subset of M of the available subcarriers.

Figure 3B:
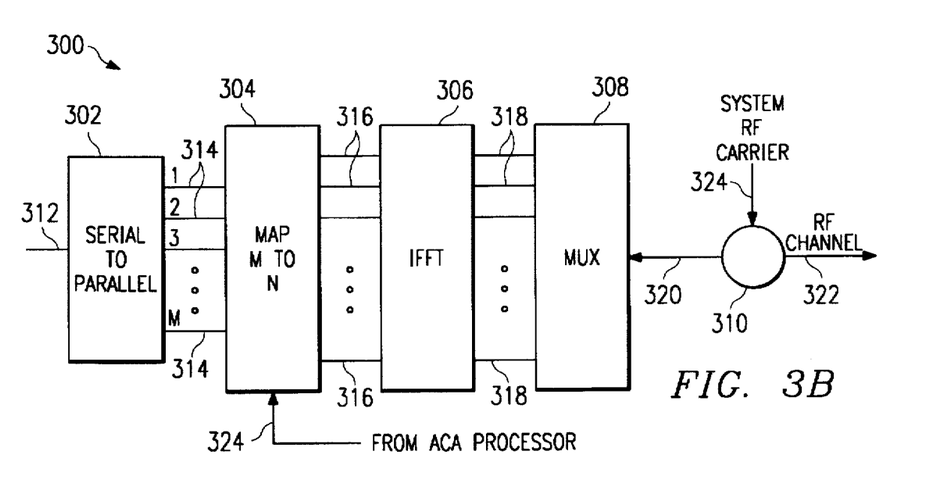
FIGS. 3B and 3C are block diagrams of a link transmitter and link receiver, respectively, according to an embodiment of the present invention.
Figure 3C:
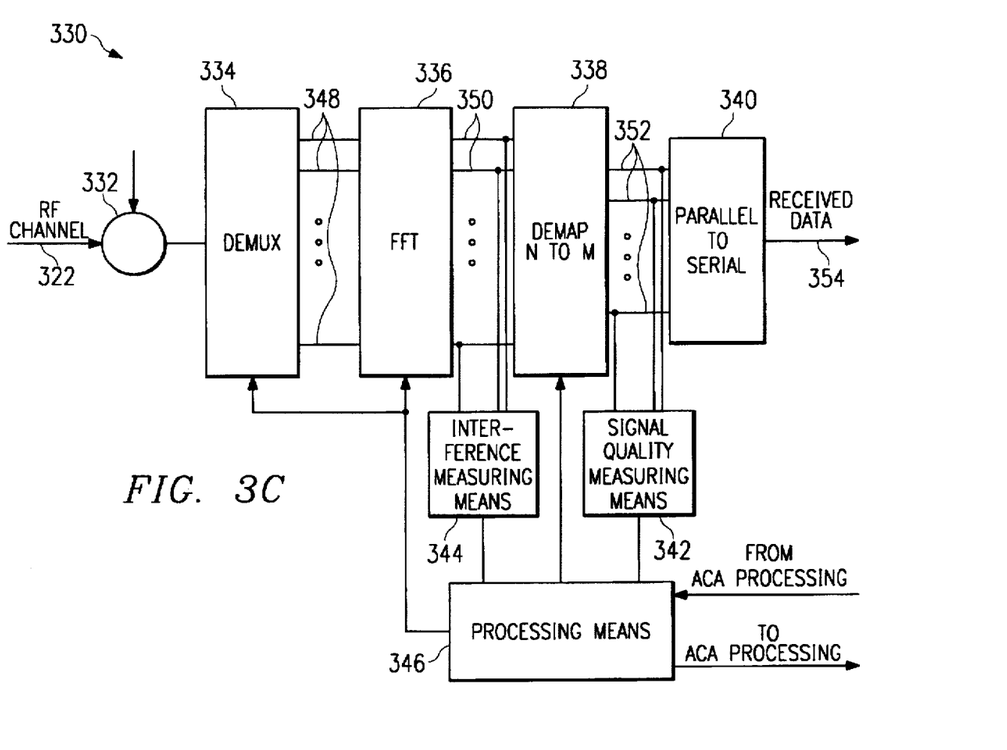

Referring now to FIGS. 3B and FIG. 3C, therein are shown functional block diagrams of transmitter 300 and receiver 330, respectively, of FIG. 3A. The functional features that are shown in FIG. 3B and FIG. 3C are common to both the base and mobile station receivers and transmitters.

Transmitter 300 includes a serial to parallel converter 302, mapping circuitry (MAP) 304, inverse fast fourier transform (IFFT) circuitry 306, a frequency multiplexer (MuX) 308, and modulator 310. In transmitter operation, serial to parallel converter 302 converts a serial digital data stream 312 into blocks of M symbols 314 where M is determined by the symbol size and data rate of the system. The M symbols are then input to the MAP circuitry 304, where each of the M symbols is mapped onto a subcarrier input of the IFFT circuitry 306. An inverse fast fourier transform (IFFT) is then performed on the blocks of data input to the IFFT circuitry 306. The signals 318 generated at the N outputs of the IFFT circuitry 306 are then multiplexed in MuX 308 to create a signal 320 containing M multiplexed subcarriers, each of which carries the data contained in one symbol of the M symbols 314. The signal 320 is then modulated onto the system RF carrier 324 at modulator 310 and transmitted as an OFDM signal over the system RF channel 322.

Receiver 330 includes demodulator 332, frequency demultiplexer (DEMUX) 334, fast fourier transform (FFT) circuitry 336, de-mapping circuitry (DEMAP) 338, a parallel to serial converter 340, interference measuring means 344, signal quality measurement means 342 and processor 346. In receiver operation, the system RF carrier is received on the system RF channel 322 and then demodulated at demodulator 332, and demultiplexed at DEMUX 334 to obtain N samples 348 of the signal containing, the M multiplexed subcarriers. A fast fourier transform (FFT) is then performed by FFT circuitry 336 with the N samples 348 as inputs to generate data signals 350 containing any modulating data that was transmitted on each subcarrier. The N subcarriers demodulated and subjected to the FFT are determined by parameters input to DEMUX 334 and FFT circuitry 336 from processor 346. Interference measurement means 344 measures the interference (i) level on each of the data signals 350 recovered from each of the N samples 348. The N received data signals 350 are then input to the de-mapping block 338 where the M data signals 352 received on the M subcarrier frequencies currently assigned to link communications are de-mapped from the N data signals 350. The de-maping is done according to parameters input to DEMAP block 338 from processor 346. The M de-mapped data signals 352 are then input to the parallel to serial converter 340 and converted into serial received data 354. Signal quality (C/I) is measured at the output of the de-mapping block 338 for each of the M de-mapped data signals 352 received on the M subcarrier frequencies currently assigned to the link on which receiver 330 is receiving.

The adaptive channel allocation for each link is implemented by ACA processing portion 360 of FIG. 3A which operates on results of measurements performed in the link receiver. In the embodiment shown, processor 346 receives interference measurements from interference measurement means 344 and signal quality measurement results from signal quality measurement means 342. The processor 346 operates on the measurement results to generate data for input to ACA processing portion 360 of the system. The data generated by processor 346 will then be transferred to ACA processing portion 360 over interface 362. In the embodiment shown, ACA processing portion 360 is located within the MSC. ACA processing portion 360 may be alternatively located within the base stations of the system. It is also conceivable the functions performed by the ACA processing portion be distributed among the mobile station, base station and MSC. Methods of configuring memories to store the necessary data, and methods of configuring microprocessors and software to perform these types of functions are well known to those skilled in the art.

When a mobile station functions as link receiver, the processor 346 transfers the ACA data to the mobile station transmitter for transmission to the system over interface 362 which comprises the uplink on the appropriate control channel. In a base station as link receiver, the processor 346 transfers the ACA data to the MSC over interface 362 which comprises landline or other connections. ACA processing portion 360 operates on the data and then returns appropriate subcarrier assignment commands to link receiver 330 over interface 364 which comprises landline or other connections when the base station is the link receiver, or the down link on the appropriate control channel when the mobile station is the link receiver. Processor 346 of link receiver 330 receives the commands and then generates the correct input parameters for the receiver so that the correct subcarriers for the link are received. ACA processing portion 360 also sends commands to MAP circuitry 304 associated with link transmitter 300 over interface 366. MAP circuitry 304 then maps the M symbols to the appropriate outputs of MAP circuitry 304 so that the correct subset of M subcarriers is transmitted on.

The necessary data transfer between the mobile stations, base stations and MSCs of the system may be accomplished by known methods. In the described embodiment the DCCH and PCCH channels may be used on both the uplink and downlink to transfer measurement results or subcarrier assignment messages between a mobile station and the system. The use of control channels to carry such information is known to those skilled in the art.

Figure 4A:
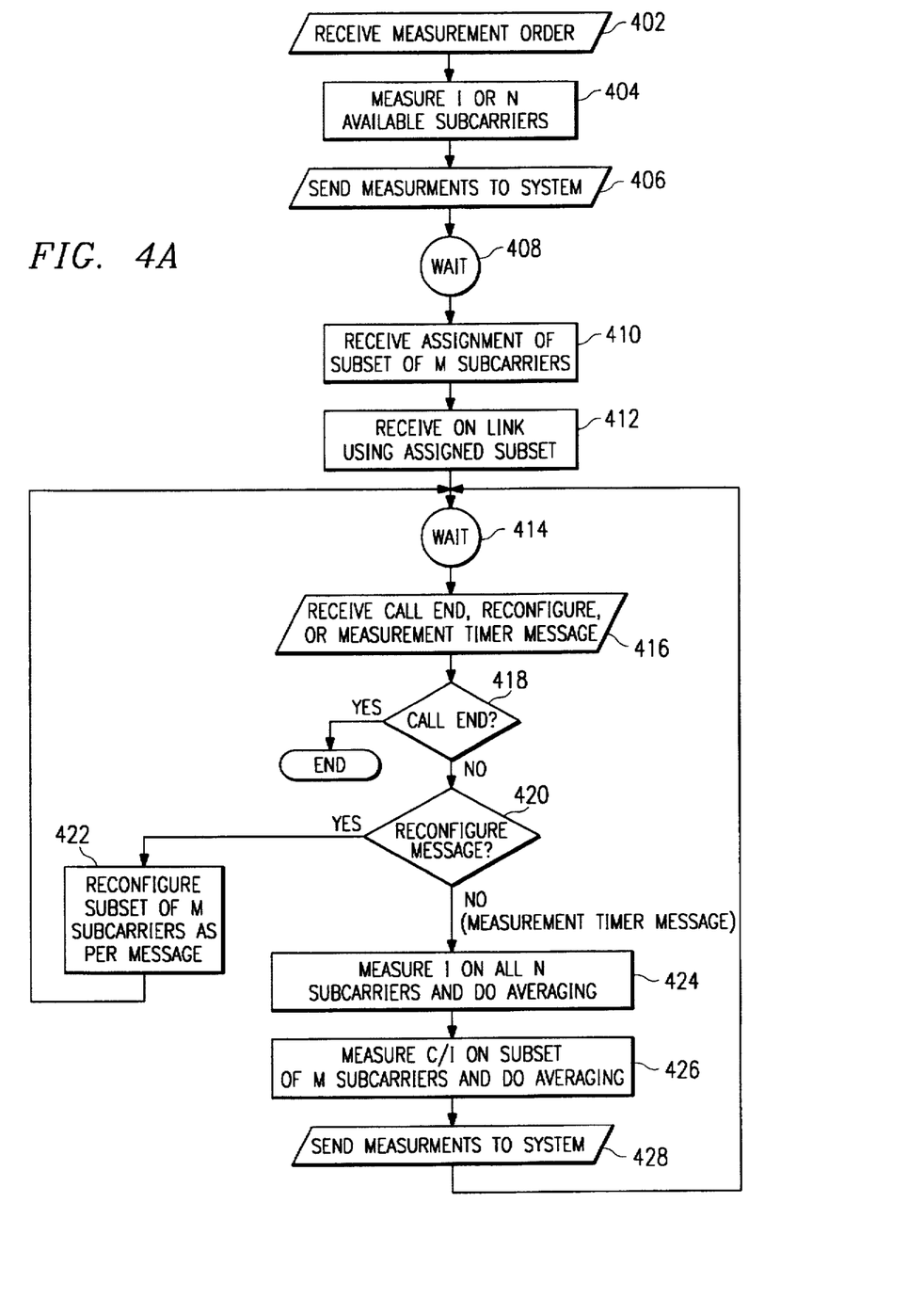
FIGS. 4A and 4B are flow diagrams of process steps according to an embodiment of the present invention performed by a link receiver.
Figure 4B:
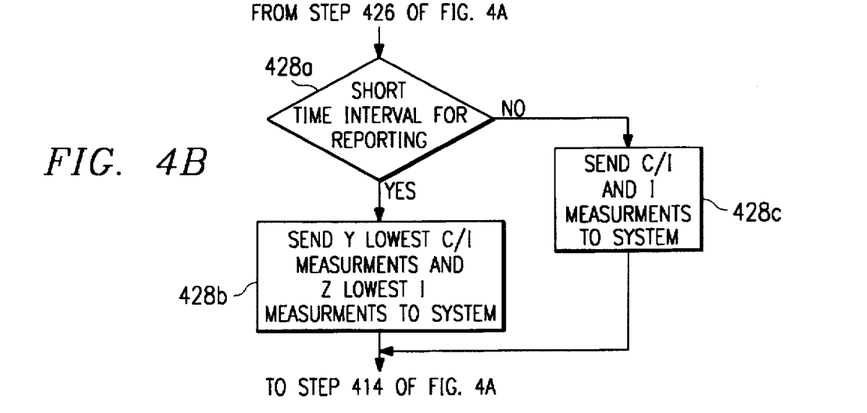

Referring now to FIG. 4A, therein is shown a flow diagram illustrating the steps performed by the link receiver 330 during the ACA process. The steps performed by a mobile station receiving on a downlink and the steps performed by a base station receiving on an uplink are essentially identical and FIG. 4A can be used to describe the steps performed by the link receiver 330 in both cases. The differences between the process steps performed in the mobile station and base station involve step 428 of FIG. 4A. FIG. 4B is a flow diagram that illustrates additional steps performed by the mobile station during step 428 of the ACA measurement process. These extra steps will be described with reference to FIG. 4B as the process of FIG. 4A is described.

The ACA process begins when it is necessary for the system to create a communications link between a mobile station base station pair on either the uplink or the downlink. Referring again to FIG. 4A, at step 402 the link receiver receives from the system a measurement order message to measure interference (I) on each of a group of N subcarriers available for the link. The N subcarriers may be all subcarriers available within the system or a smaller group of subcarriers chosen from all subcarriers available within the system. Next, at step 404 the I measurements are performed. Then, from step 404 the process moves to step 406 where the I measurement results are sent to the system. When a mobile station is the link receiver, the I measurement results are transmitted over the DCCH or PCCH channel to the base station and then transferred to the MSC. When a base station is the link receiver, the I measurement results are transferred to the MSC via the appropriate overland means. After transmitting the I measurement results the process moves to step 408 where the link receiver waits for a response from the system. The process steps that take place when the link receiver is in the wait state at step 408 will now be described with reference to FIG. 5.

Figure 5:
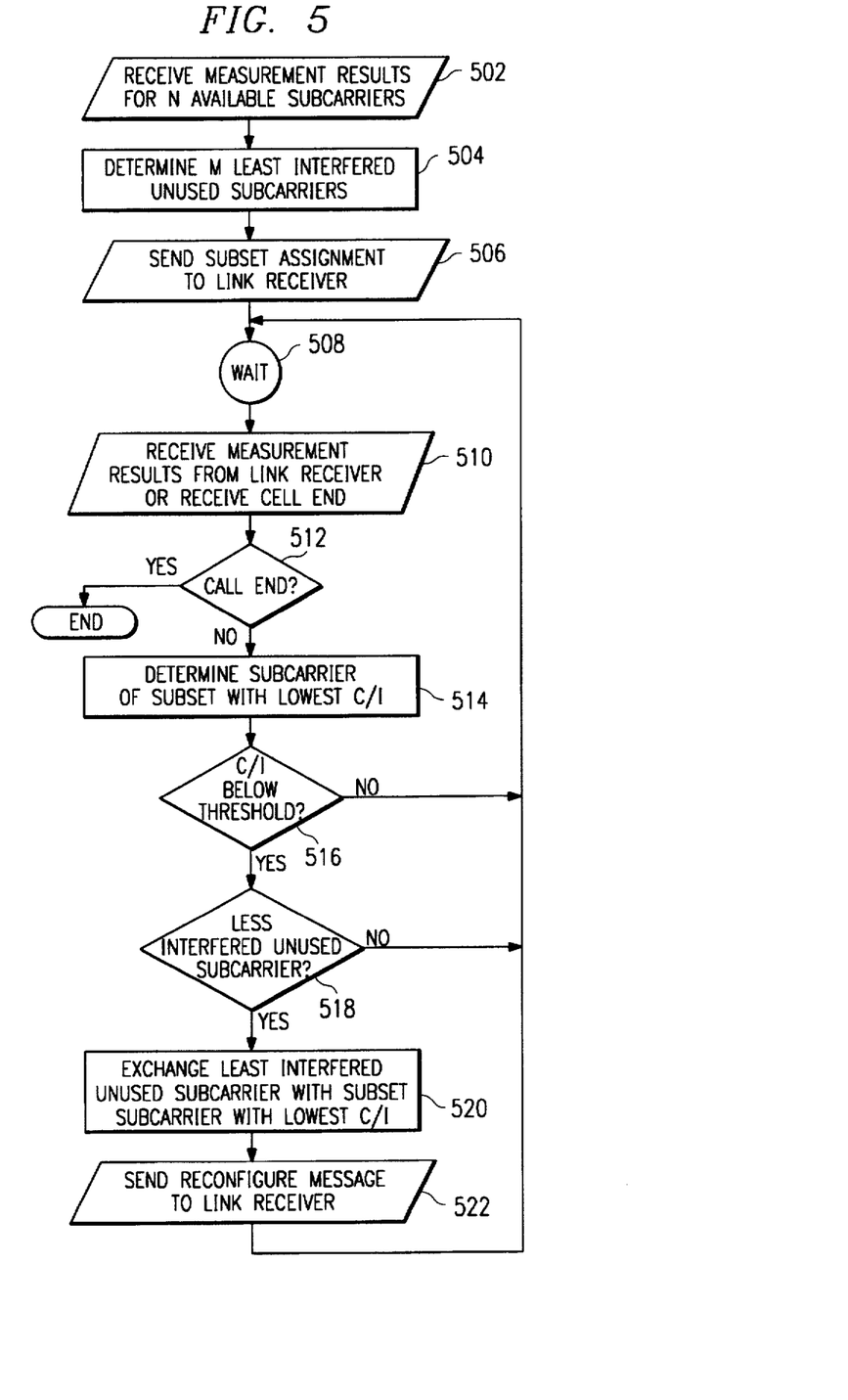
FIG. 5 is a flow diagram of process steps according to an embodiment of the present invention performed within a cellular telecommunications network.

Referring now to FIG. 5, therein are shown the process steps performed within the ACA processing portion of system during the ACA process. At step 502 the results of the I measurement performed on the N subcarriers at the link receiver are received by the ACA processor. Next, at step 504 the ACA processor determines the M least interfered unused subcarriers from the results of the I measurements made on the N subcarriers. From step 504 the process then moves to step 506 where a subcarrier assignment message assigning the subset of the least interfered M subcarriers to the link is sent to both the link receiver and the link transmitter. The ACA processor now moves to step 508 and waits for further input from the link receiver. The process flow now returns to step 408 FIG. 4A. Alternative methods of determining the M subcarriers for the subcarrier assignment message may be used in place of step 506. For example, the subcarriers could be assigned on the basis of how their use effects transmissions in neighboring cells. If one of the least interfered M subcarriers was used in a neighbor cell, the subcarrier would not be used. In this case the M subcarriers may not be the least interfered M subcarriers.

Referring again to FIG. 4A, the link receiver which has been in the wait state at 408 now moves to step 410 and receives the channel assignment message assigning the subset of M subcarriers to the link. Next, the process moves to step 412 as the link receiver begins receiving on the link using the assigned subset of M subcarriers. From step 412 the process now moves to step 414 and waits for further input. At step 416 an input is received. The link receiver may receive three types of inputs while receiving using the assigned subset of M subcarriers. At decision step 418 the link receiver determines if a call end signal has been received. If a call end signal has been received the process ends. The call end signal may have been transmitted by the system to the link receiver or initiated at the link receiver itself. A call end signal indicates to the process that communications on the link have terminated. If a call end has not been received, the process moves to step 420 and the link receiver determines whether a measurement timer message has been received. The measurement timer is contained in the processor associated with the link receiver. The measurement timer generates a measurement message at periodic intervals informing the link receiver to make measurements. Each measurement timer signal defines a measurement interval. If a measurement timer message has been received the process moves to step 424. At step 424 the link receiver measures I on the set of N subcarriers. The I measurements may be averaged with the results of a certain number of previous I measurements for each subcarrier to obtain accuracy. The first time through step 424 the measurements are averaged with the results obtained in step 404. On subsequent passes through step 424 the measurement results are averaged with the last n previous measurements, where n is a value allowing an accurate following of a subcarrier's interference level within the system. From step 424 the process moves to step 426 and the link receiver measures C/I on each of the subset of M carriers. The C/I measurements are also averaged with the last n previous C/I measurements. Then, at step 428 the link receiver sends the I and C/I measurement results to the ACA processing portion of the system. Depending on whether the link receiver is the base station or mobile station, step 428 may be performed in differing ways. If the link receiver is a base station the averaged measurement results may be sent directly to the ACA processor. If the link receiver is a mobile station in a downlink the substeps shown in FIG. 4B may be used to reduce signaling traffic as the results are transmitted to the system over the uplink via the base station.

Referring now to FIG. 4B, therein is shown a flow diagram illustrating process substeps performed by a mobile station performing step 428 of FIG. 4A. Signaling traffic on the uplink is reduced by transmitting differing sets of measurement results to the system over differing time intervals. Over long reporting intervals all I measurement and C/I measurement results are transmitted to the system. Over shorter reporting intervals a reduced set of each of the I measurement and C/I measurement results are transmitted. The long and short intervals may be defined so that a long interval occurs every nth short interval or every nth measurement period, where n is a number such as, for example, 25. At step 428a the mobile station determines whether the measurement period involves a short time interval for reporting measurement results. If it is determined that the measurement period involves a short time interval for reporting measurement results the process moves to step 428b, where the mobile station transmits the C/I measurements for the Y worst quality subcarriers of the subset of M subcarriers, where Y<M, and the I measurements for the Z least interfered of the N subcarriers to the system, where Z<N. The values of Y and Z are chosen to allow adequate information for effective ACA while minimizing signaling traffic. Y may be set to 1 and Z may be set to a number calculated to contain on average the I measurement results of at least one subcarrier not used within the same cell. The process then moves to step 414 where the mobile station waits for further input. However, if, at step 428a, it is determined that the measurement period does not involve a short time interval for reporting measurement results the process moves to step 428c. At step 428c the mobile station transmits the C/I measurements for the whole subset of M subcarriers and the I measurements for all N subcarriers to the system. The process then moves to step 414 where the mobile station waits for further input. The process flow now moves to FIG. 5 as the ACA processor receives the measurement results from the link receiver.

Referring again to FIG. 5, the ACA processor which has been in the wait state at step 508, receives an input from the link receiver at step 510. The ACA processor may receive measurement results or a call end signal at step 510. When an input is received the process moves to step 512 where it is determined what type of input was received. If a call end signal is received the process ends. In this example the received message is measurement results so the process moves to step 514. At step 514 the ACA processor determines the subcarrier of the subset of M used subcarriers with the lowest C/I measurement value. Next, at step 516 it is determined if the C/I of the lowest C/I measurement value of the subset of M subcarriers is below the ACA C/I trigger threshold.

If, at step 516, it is determined that the lowest C/I measurement value is not below the ACA C/I trigger threshold the process flow will return to step 508 where the ACA processor will wait for further input. If, however, at step 516 it is determined that the lowest C/I measurement value is below the ACA C/I trigger threshold the process flow will instead move to step 518. At step 518 the ACA processor determines whether an unused subcarrier of the set of N subcarriers exists which has an I measurement value less than the I measurement value of the subcarrier of the subset of M with the lowest C/I measurement value. If at step 518 it is determined that no unused subcarrier exists with a lower I measurement value, the process flow will return to step 508 where the ACA processor will wait for further input. If, however, at step 518 an unused subcarrier exists with a lower I measurement value, a more preferred subcarrier exists and, the process moves to step 520. At step 520 the ACA processor inserts the least interfered unused subcarrier into the subset of M subcarriers and removes the subcarrier of the subset of M with the lowest C/I measurement value from the subset. To avoid hysterisis effects the change of subcarriers may be performed after calculating a C/I for the least interfered unused subcarrier during step 518 and determining that the calculated C/I is a minimum amount above the C/I of the subcarrier to be removed. If the C/I for the least interfered unused subcarrier is not a minimum amount above the C/I of the subcarrier to be removed the unused subcarrier can be considered not acceptable as a replacement. From step 520 the process moves to step 522 where the system sends a reconfigure subset message to the link receiver instructing the link receiver to reconfigure the subset of M subcarriers assigned to the link to conform to the changes made by the processor. Then the ACA processor moves to step 508 and waits for further input from the link receiver. The procedure given by steps 514–520 could alternately be performed by determining a plurality of less interfered unused subcariers and exchanging these with a plurality of used subcarriers having an interference level below the C/I threshold. The subset could also be reconfigured according to other criteria. For example, the subset of M could be reconfigured on the basis of the effect of using the subset, in the cell of the link, on communications occurring in neighbor cells. If some of the M subcarriers used in the cell were also used in neighbor cells, these could be replaced with subcarriers unused in the cell and also not used in neighbor cells. Reconfiguration could take place even if the used subcarriers were not below a C/I threshold or even if the unused subcarrier had an interference level greater than the replaced subcarriers.

The process continues as long as a call is ongoing and communications on the link continue. The link receiver will next move from the wait state at step 408 upon receiving an input and the process steps shown in FIGS. 4A, 4B and 5 will be repeated until the call ends and a call end signal is received by the link transmitter, link receiver and ACA processing portion of the system.

In an alternative embodiment of the invention, a mobile station as link receiver transmits request messages requesting a certain subset of M subcarriers, or requesting replacements for the M subcarriers, to be used on the link. Signal measurement results need not be transmitted from the mobile station to the system. The system in turn transmits subset accepted or subcarrier accepted messages to the mobile station. The downlink ACA processing mainly takes place in the processor 346 of the receiver in the mobile station. In this alternative embodiment steps 504, 514, 516, 518 and 520 shown in FIG. 5, which are performed by the system in the first embodiment, would be performed by processor 346 in the mobile station. The base station ACA process flow for uplink measurements remains as illustrated in FIGS. 4A, 4B and 5.

Figure 6A:
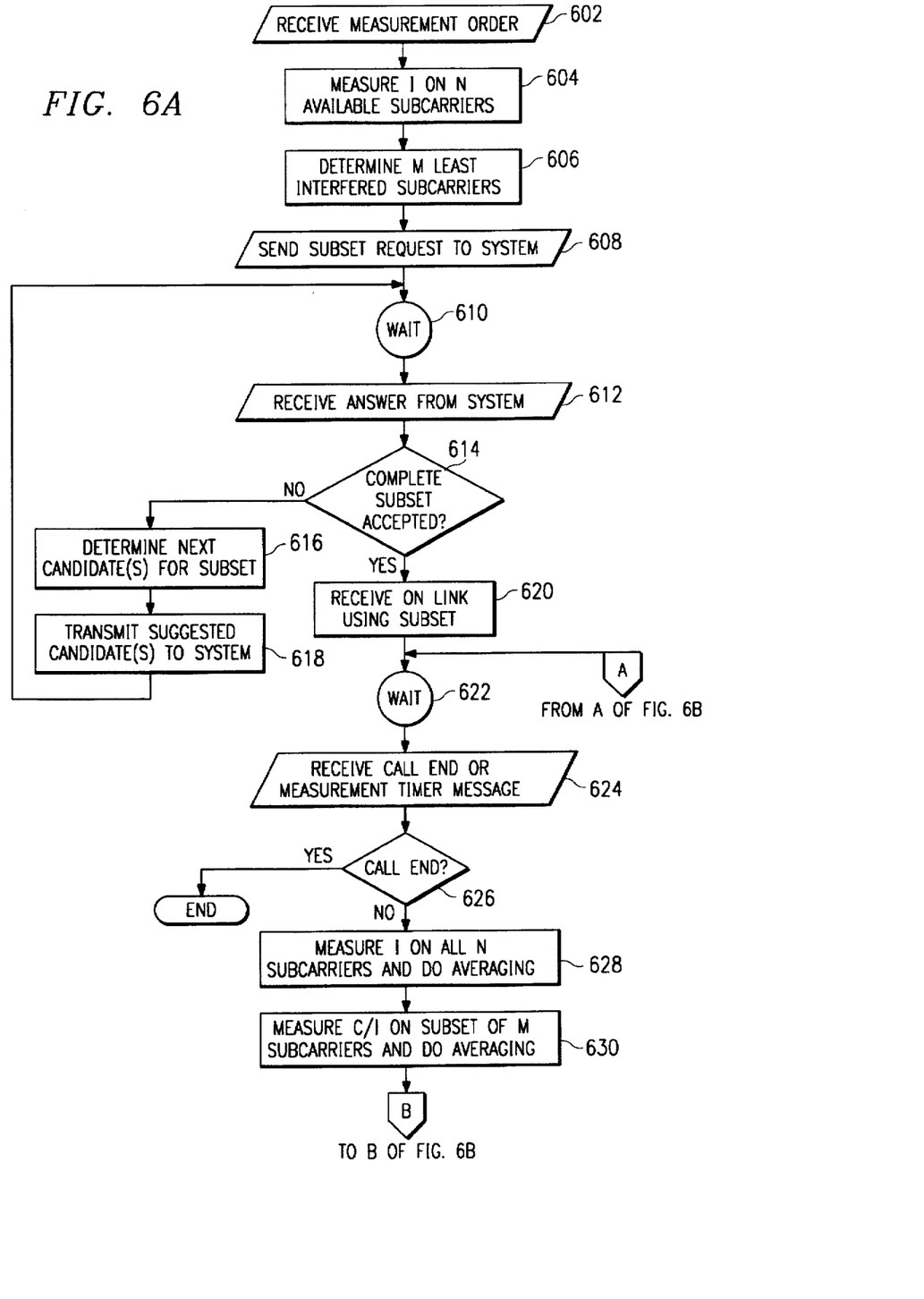
FIGS. 6A and 6B are flow diagrams of process steps according to an alternative embodiment of the present invention performed by a link receiver.

Referring now to FIG. 6A, therein is shown a flow diagram illustrating the steps performed by a mobile station as the link receiver during the ACA process of the alternative embodiment of the invention. The ACA process begins when the mobile station receives a measurement order message at Step 602. Next, at Step 604 the interference (I) on each of the group of N subcarriers available for the link is measured at the mobile station. Next, the process moves to Step 606 where the M least interfered subcarriers are determined. From Step 606 the process moves to Step 608 and a subset request message is sent to the system by the mobile station. The subset request message indicates to the system that the mobile station requests the use of each subcarrier in the requested subset. The process now moves to Step 610 and the mobile station waits for an answer from the system. The process steps that take place when the process is in the wait state at Step 610 will now be described with reference to FIG. 7.

Figure 7:
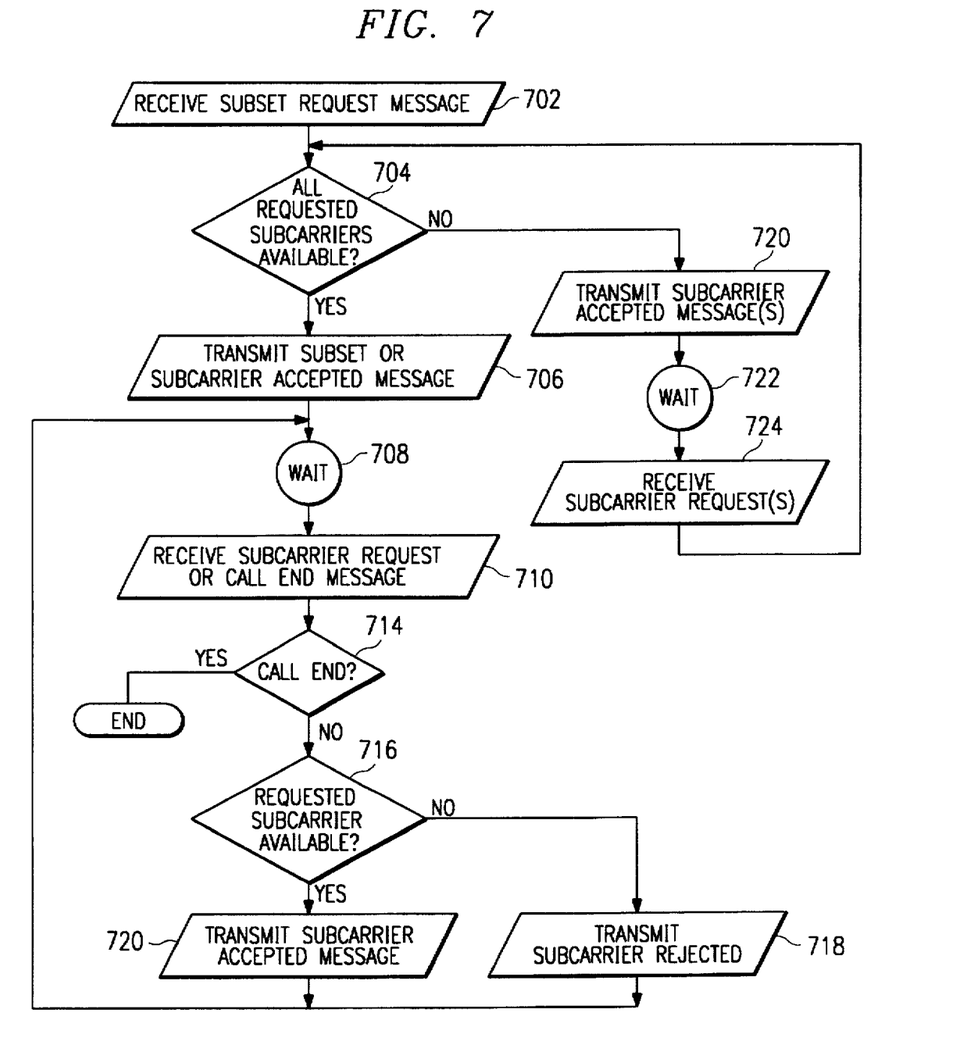
FIG. 7 is a flow diagram of process steps according to an alternative embodiment of the present invention performed within a cellular telecommunications system.

Referring now to FIG. 7, therein are shown process steps performed within the ACA processing portion of the system according to the alternative embodiment of the invention when the mobile station is involved in the ACA process. At Step 702 the ACA processing portion receives the subset request message. Next, at Step 704 the system determines if the mobile is allowed to use all of the M subcarriers in the requested subset. Certain subcarriers may not be available for use in the cell, for example, if they are being used by another mobile station or, if they have been reserved within the system for special uses. The availability of the M subcarrier may also be determined as to how their use effects transmissions in neighboring cells. The ACA is designed to allow flexibility to the system operators in making these decisions. If it is determined that the mobile station is allowed to use all M subcarriers in the requested subset, the system will transmit a subset accepted message to the link receiver. If however, at Step 704, it is determined that subcarriers of the suggested subset cannot be used by the mobile station, the process moves to Step 720 and the system transmits a subcarrier rejected message rejecting the unavailable subcarriers as part of the subset of M subcarriers. The process flow now moves to Step 722 as the process waits for a reply from the mobile station.

Referring now to FIG. 6A, at Step 612 the mobile station receives a subset accepted message or subcarrier rejection message transmitted from the system. If a subset acceptance message is received, the process moves to Step 620 where the link receiver begins receiving using the assigned subset. If however, at Step 614, it is determined that a subcarrier rejected message(s) has been received, the process moves to Step 616. At Step 616, the link receiver determines the next candidate(s) to replace the rejected requested subcarrier(s). These candidates would be the next least interfered subcarriers of the set of N available subcarriers that are not in the suggested set of M.

From Step 616 the process then moves to Step 618 where a subcarrier request message requesting the next candidate subcarrier(s) is transmitted to the system. The process then moves to Step 610 as the link receiver waits for an answer. The process will continue through the loops formed by the Steps 610, 612, 614, 616, 618, and, 706 and 708, until the complete subset of M subcarriers is accepted. Then the process moves to Step 620 where the mobile station begins receiving on the link using the accepted subset. The process now moves to the wait state of Step 622. When in the wait state of Step 622 the process may receive either a call end or measurement timer message. The call end and measurement timer messages are equivalent to the call end and measurement messages described above for the previous embodiment of the invention. The link receiver receives the call end or measurement timer message at Step 624 and moves to Step 626 where it is determined if a call end was received. If a call end is received the process ends. If, however, a measurement timer message was received, the process moves to Step 628. At Step 628 the mobile station measures I on all N available subcarriers and averages the results for each subcarrier. Next, at Step 630, the link receiver measures C/I on the subset of M subcarriers and averages the results for each subcarrier. The process now moves to Step 632 of FIG. 6B.

Figure 6B:
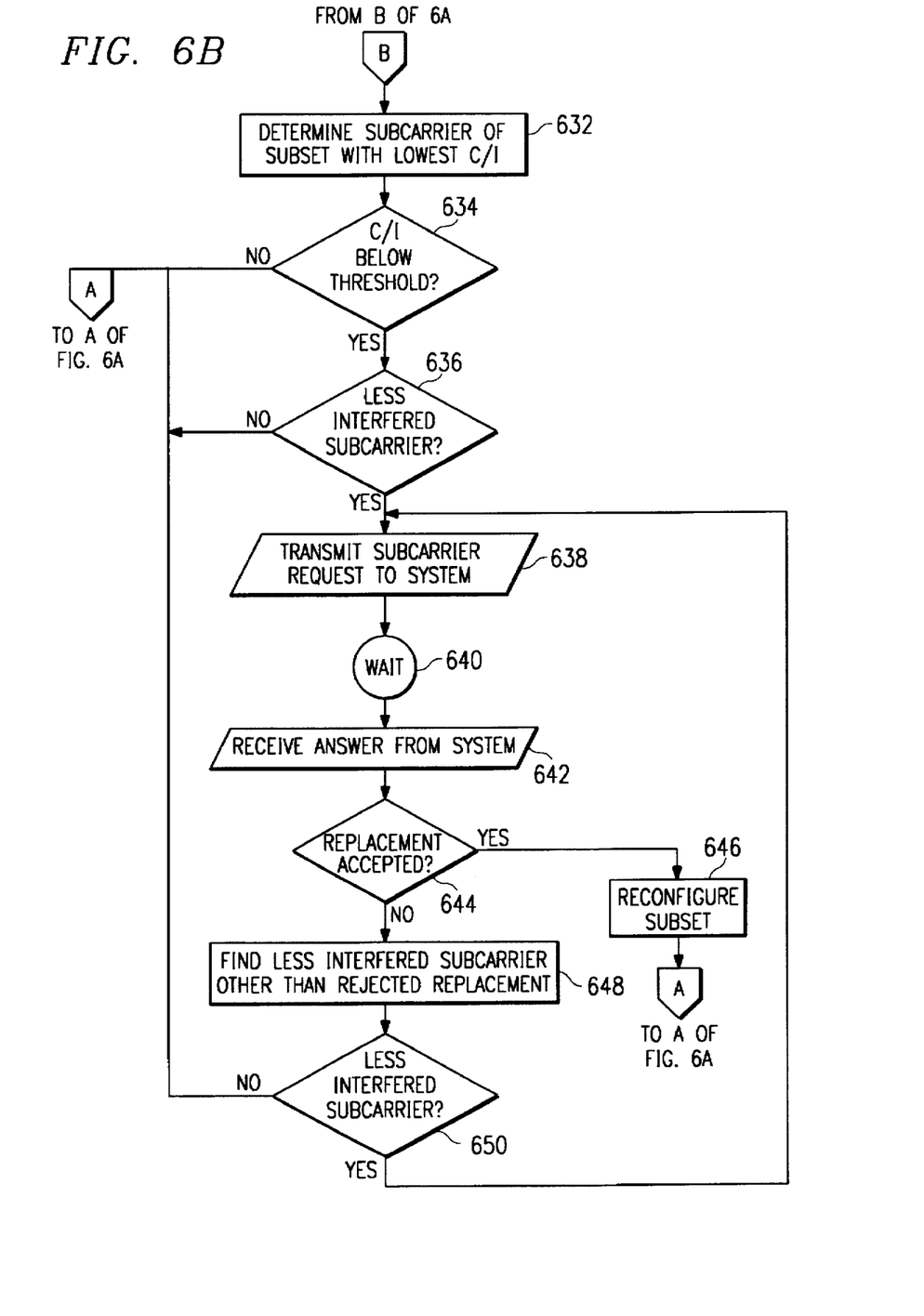

At Step 632 the link receiver determines the subcarrier of the subset of M with the lowest C/I. Next, at Step 634 it is determined if the lowest C/I is below a threshold. If it is not below the threshold, the process returns to Step 622 where the link receiver waits for another call end or measurement timer message. If, however, it is determined that the lowest C/I is below the threshold C/I, the process moves to Step 636. At Step 636 it is determined if a less interfered subcarrier of the set of N not in the subset of M exists. If a less interfered subcarrier does not exist the process returns to Step 622. If, however, a less interfered subcarrier does exist, a more preferred subcarrier exists and the process moves to Step 638. At Step 638 the mobile station transmits a subcarrier request message to the system requesting the least interfered subcarrier not in the subset of M subcarriers as a replacement for the subcarrier with the lowest C/I. The process within the mobile station now moves to the wait state of Step 640 and the process flow moves to Step 708 of FIG. 7. The ACA processing portion of the system receives the requested subcarrier message at Step 710. The procedure outline in steps 632–638 could alternately be performed by determining a plurality of used subcarriers with the lowest C/Is of the subset and then determing a plurality of less interfered unused subcarriers as requested replacements. After receiving the subcarrier requested message it is determined, at step 716, if the requested subcarrier is used within the cell on a link with another mobile station. If the requested subcarrier is used within the cell the system moves to Step 718 and transmits a requested subcarrier rejected message to the mobile station and the process returns to Step 708. If, however, the suggested replacement is unused within the cell, the system transmits a requested subcarrier accepted message to the mobile station and the process returns to Step 708. As an alternative to determining if the requested subcarrier is used with the cell, other criteria may also be used to determine availability. For example, if the requested subcarrier is used in a neighbor cell the system could reject the subcarrier request. The process then moves from the wait state of Step 640 to Step 642 as the mobile station receives the acceptance or rejection message. Next, at Step 644, it is determined if the requested subcarrier was accepted. If the requested subcarrier was accepted the process moves to Step 646 and the mobile station reconfigures the subset of M subcarriers on which the mobile station is receiving to include the requested subcarrier and deletes the subcarrier with the lowest C/I. Then, the process moves to the wait state of Step 622. If, however, the requested subcarrier is not accepted the process moves to Step 648. At Step 648 the mobile station determines if a new candidate subcarrier less interfered than the subcarrier of M subcarriers with the lowest C/I, that has not been already rejected as a requested subcarrier within this measurement interval, exists. If a new candidate subcarrier does not exist the process moves back to the wait state of Step 622. If, however, a new candidate subcarrier does exist, the process moves to Step 638 where the mobile station transmits a subcarrier request message to the system. The message requests the new candidate subcarrier found at Step 648 as the new replacement subcarrier. The process then moves to Step 640 and waits for an answer from the system. The process will continue through the loops formed by Steps 642, 644, 648, 650, and, 638 and 710, 712, 714, and 716 or 718, until a requested subcarrier is accepted or no new candidate exist. The process then moves to the wait state of Step 622. The ACA process will continue throughout the call and be invoked each time a measurement timer message is received. When the call ends, the process will end through Steps 624 and 626.

As can be seen from the above description, the invention provides a method and system of adaptive channel allocation for an OFDM system. Use of the invention will enhance the performance of OFDM systems into which it is implemented. The adaptive channel allocation is designed to minimize the signaling resources necessary to carry measurement results on the system uplinks will still provide the benefits of adaptive channel allocation. The result is a system with better spectral efficiency, less dropped calls and better quality communications for each link.

It is believed that the operation and construction of the present invention will be apparent from the foregoing description and, while the invention shown and described herein has been characterized as particular embodiments, changes and modifications may be made therein without departing from the spirit and scope of the invention as defined in the following claims.

What is claimed is:

1. In a telecommunications system in which communications from a link transmitter to a link receiver are transmitted over a subset of a set of a plurality of subcarriers available to a link, a method of allocating subcarriers for communications on a link, said method comprising the steps of:

allocating the plurality of subcarriers from said set to provide said subset;

measuring a received signal on each subcarrier of said set;

determining if at least one unused subcarrier exists in said set that is more preferred for use on said link than a subcarrier of said subset allocated to provide said subset; and reconfiguring said subset in response to an affirmative determination during said step of determining if the at least one unused subcarrier exists that is more preferred.

2. The method of claim 1 in which said step of measuring comprises the steps of:

measuring a interference level (I) on each subcarrier of said set.

3. The method of claim 1 in which said step of measuring comprises the steps of:

measuring a signal quality (C/I) on each subcarrier of said subset.

4. In a telecommunications system in which communications from a link transmitter to a link receiver are transmitted over a subset of a set of a plurality of subcarriers available to a link, a method of allocating subcarriers for communications on the link, said method comprising the steps of:

measuring an interference level (I) on each subcarrier of said set;

determining said subset, said subset comprising a plurality of least interfered unused subcarriers of said set;

measuring a received signal on each subcarrier of said set;

determining if at least one unused subcarrier exists in said set that is more preferred for use on said link than a subcarrier of said subset; and reconfiguring said subset in response to an affirmative determination during said step of determining if the at least one unused subcarrier exists that is more preferred.

5. The method of claim 4 in which said step of measuring an interference level (I) further comprises the step of:

transmitting a plurality of results of said interference level (I) measurements from said link receiver to said system, wherein the number of said plurality of results transmitted is less than the number of subcarriers in said set.

6. In a telecommunications system in which communications from a link transmitter to a link receiver are transmitted over a subset of a set of a plurality of subcarriers available to a link, a method of allocating subcarriers for communications on the link, said method comprising the steps of:

allocating the plurality of subcarriers from said set to provide said subset;

measuring an interference level (I) on each subcarrier of said set;

measuring a signal quality level (C/I) on each subcarrier of said subset;

determining a subcarrier of said subset with a lowest signal quality level (C/I);

determining if an unused subcarrier of said set exists that has an interference level (I) lower than the interference level (I) of said subcarrier of said subset with said lowest signal quality level (C/I); and reconfiguring said subset in response to an affirmative determination during said step of determining if the at least one unused subcarrier exists that has the interference level of the subcarrier of the subset.

7. The method of claim 6 in which said step of reconfiguring comprises the steps of:

removing said subcarrier with said lowest signal quality (C/I) from said subset in response to an affirmative determination during said step of determining if the unused subcarrier of the set exists that has an interference level lower than the interference level of the subcarrier of the subset; and inserting said unused subcarrier into said subset.

8. The method of claim 6 further comprising the intermediary step subsequent to said step of measuring the interference level (I), of:

transmitting a plurality of interference level (I) measurements measured during said step of measuring the interference level from said link receiver to said system, wherein the number of interference measurements transmitted is less than the number of subcarriers in said set; and, further comprising the intermediary step, subsequent to, said step of measuring the signal quality (C/I), of:

transmitting a plurality of signal quality (C/I) measurements measured during said step of measuring the signal quality level from said link receiver to said system, wherein the number of signal quality measurements transmitted is less than the number of subcarriers in said subset.

9. In a telecommunications system in which communications from a link transmitter to a link receiver are transmitted over a subset of a set of a plurality of subcarriers available to a link, a method of allocating subcarriers for communications on the link, said method comprising the steps of:

measuring an interference level (I) on each subcarrier of said set;

determining a candidate subset, said candidate subset comprising a plurality of least interfered subcarriers of said set;

transmitting a subset request message from said link receiver to said system;

receiving an answer message formed of at least one subcarrier rejected message from said system at said link receiver;

determining whether said candidate subset is accepted for said link from said answer message by determining at least one next candidate subcarrier for said subset, transmitting at least one subcarrier requested message from said link receiver to said system, and repeating the steps of determining the next candidate subcarrier and the step of transmitting the subcarrier requested message to the system until a complete subset is accepted;

measuring a received signal on each subcarrier of said set;

determining if at least one unused subcarrier exists in said set that is more preferred for use on said link than a subcarrier of said subset; and reconfiguring said subset in response to an affirmative determination during said step of determining if the at least one unused subcarrier exists that is more preferred.

10. The method of claim 9 in which said step of receiving an answer message comprises receiving a subset accepted message.

11. In a telecommunications network in which communications from a link transmitter to a link receiver are transmitted over a subset of a set of a plurality of subcarriers available to a link, a system for allocating subcarriers for communications on the link, said system comprising:

means for allocating a plurality of subcarriers from said set to provide said subset;

means for measuring a received signal on each subcarrier of said subset;

means for determining if at least one unused subcarrier exists in said set that is more preferred for use on said link than a subcarrier of said subset allocated by said means for allocating; and means for reconfiguring said subset in response to an affirmative determination by said means for determining if the at least one unused subcarrier exists that is more preferred.

12. The system of claim 11 in which said means for allocating comprises:

means for measuring an interference level (I) on each subcarrier of said set; and means for determining said subset, said subset comprising a plurality of least interfered subcarriers of said set.

13. The system of claim 12 in which said means for measuring an interference level (I) further comprises:

means for transmitting a plurality of results of said interference level (I) measurements from said link receiver to said system, wherein the number of said plurality of results transmitted is less than the number of subcarriers in said set.

14. The system of claim 11 in which said means for measuring comprises:

means for measuring an interference level (I) on each of subcarriers of said set.

15. The system of claim 11 in which said means for measuring comprises:

means for measuring a signal quality (C/I) on each subcarriers of said subset.

16. The system of claim 11 in which said means for measuring comprises:

means for measuring an interference level (I) on each subcarrier of said set; and means for measuring a signal quality level (C/I) on each subcarrier of said subset; and, said means for determining comprises:

means for determining a subcarrier of said subset with a lowest signal quality level (C/I); and means for determining if an unused subcarrier of said set exists that has an interference level (I) lower than the interference level (I) of said subcarrier of said subset with said lowest signal quality level (C/I).

17. The system of claim 16 in which said means for reconfiguring comprises:

means for removing said subcarrier with said lowest signal quality (C/I) from said subset in response to an affirmative determination by said means for determining if the unused subcarrier of the set exists that has the interference level lower than the interference level of the subcarrier of the subset; and means for inserting said unused subcarrier into said subset.

18. The system of claim 16 in which said means for measuring the interference level (I) further comprises:

means for transmitting a plurality of interference level (I) measurements measured by said means for measuring the interference level from said link receiver to said system, wherein the number of interference level measurements transmitted is less than the number of subcarriers in said set; and, said means for measuring the signal quality (C/I) level further comprises:

means for transmitting a plurality of signal quality (C/I) measurements measured by said means for measuring the signal quality level from said link receiver to said system, wherein the number of signal quality measurements transmitted is less than the number of subcarriers in said subset.

19. In a telecommunications system in which communications from a link transmitter to a link receiver are transmitted over a subset of a set of a plurality of subcarriers available to a link, a method of allocating subcarriers for communications on the link, said method comprising the steps of:

allocating the plurality of subcarriers from said set to provide said subset;

measuring a received signal on each subcarrier of said set by measuring an interference level (I) on each subcarrier of the set and measuring a signal quality level (C/I) on each subcarrier of the subset;

determining if a candidate subcarrier of said set exists that is more preferred for use on said link than a subcarrier of said subset by determining a subcarrier of the subset with a lowest signal quality level (C/I) and determining a candidate subcarrier of the set that has an interference level (I) lower than the interference level (I) of the subcarrier of the subset with the lowest signal quality level;

transmitting a subcarrier request message from said link receiver to said system;

receiving an answer from said system at said link receiver;

determining from said answer if said candidate subcarrier is unused;

repeating, in response to a negative determination during said step of determining from said answer if the candidate subcarrier is used, the steps of determining if a subcarrier of said set exists that is more preferred, transmitting a subcarrier request, receiving an answer, and determining from said answer, each time with a different candidate subcarrier, until an affirmative determination during said step of determining from said answer if the candidate subcarrier is unused is obtained; and reconfiguring said subset in response to an affirmative determination during said step of determining from said answer if the candidate subcarrier is unused is obtained.

20. In a telecommunications network in which communications from a link transmitter to a link receiver are transmitted over a subset of a set of a plurality of subscribers available to a link, a system for allocating subcarriers for communications on the link, said system comprising:

means for measuring an interference level (I) on each subcarrier of said set;

means for determining a candidate subset, said candidate subset comprising a plurality of least interfered subcarriers of said set;

means for transmitting a subset request message from said link receiver to said system;

means for receiving an answer message formed of one or more subcarrier rejected messages from said system to said link receiver;

means for determining whether said candidate subset is accepted for said link from said message, said means for determining whether said candidate subset is accepted comprising means for determining one or more next candidate subcarriers for said subset, means for transmitting one or more subcarrier requested messages from said link receiver to said system, and means for repeating said steps of determining one or more next candidate subcarriers and transmitting one or more subcarrier requested messages to said system until a complete subset is accepted;

means for measuring a received signal on said subcarrier of said subset;

means for determining if at least one unused subcarrier exists in said set that is more preferred for use on said link than a subscriber of said subset; and means for reconfiguring said subset in response to an affirmative determination.

21. The system of claim 20 in which said means for receiving an answer message comprises means for receiving a subset accepted message.

22. In a telecommunications network in which communications from a link transmitter to a link receiver are transmitted over a subset of a set of a plurality of subscribers available to a link, a system for allocating subcarriers for communications on the link, said system comprising:

means for allocating a plurality of subcarriers from said set to provide said subset;

means for measuring a received signal on each subcarrier of said subset, said means for measuring the received signal including means for measuring the interference level (I) of each subcarrier of said set, and means for measuring the signal quality level (C/I) on each subcarrier of said subset;

means for determining if a candidate subcarrier of said set that is more preferred for use on said link than a subcarrier of said subset, said means for determining if the subcarrier exists including means for determining a subcarrier of said subset with a lowest signal quality level (C/I), and means for determining a candidate subcarrier of said set that has an interference level (I) lower than the interference level (I) of said subcarrier of said subset with said lowest signal quality level (C/I);

means for transmitting a subcarrier request message from said link receiver to said system;

means for receiving an answer from said system at said link receiver;

means for determining from said answer if said candidate subcarrier is unused; and means for reconfiguring said subset in response to an affirmative determination.

* * * * *